D. KEETHLER.
Corn Planter.
No. 97,200. Patented Nov. 23, 1869.
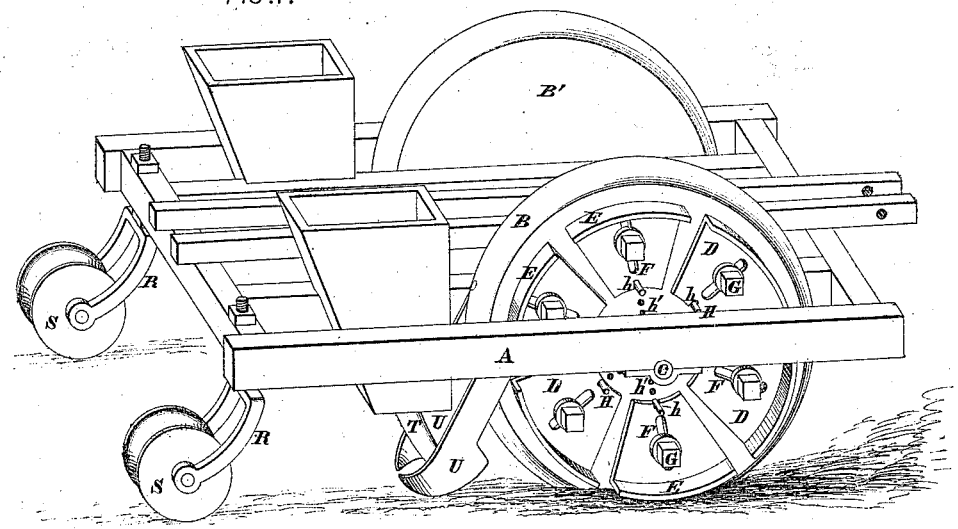
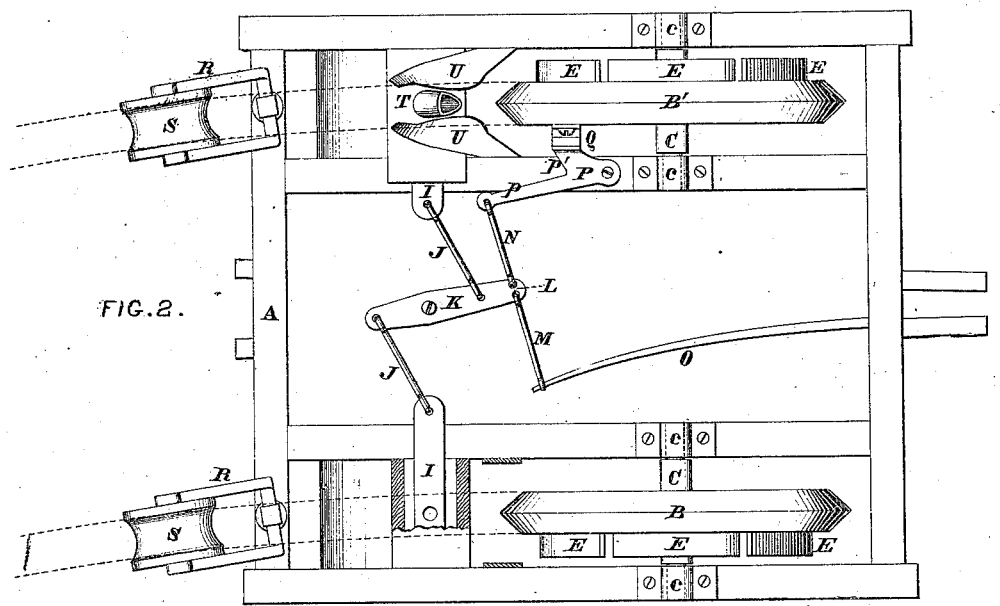
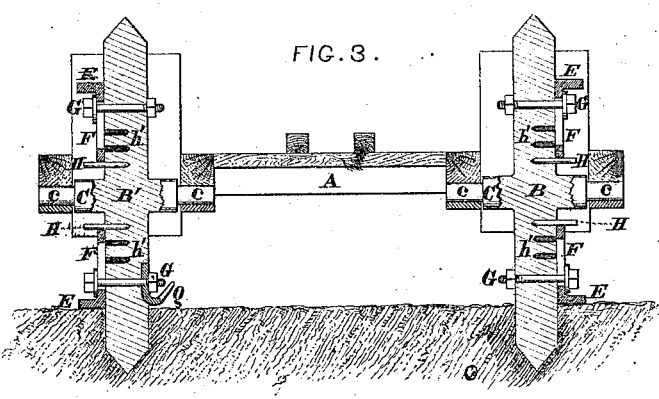
ATTEST:
Jas. H. Layman
Samuel Knight
D. Keethler
INVENTOR.
By Knight Bros.
Attys.

United States Patent Office.

DANIEL KEETHLER, OF MOUNT OREB, OHIO.

Letters Patent No. 97,200, dated November 23, 1869.

IMPROVEMENT IN CORN-PLANTERS.

The Schedule referred to in these Letters Patent and making part of the same.

I, DANIEL KEETHLER, of Mount Oreb, in the county of Brown, and State of Ohio, have invented certain Improvements in Corn-Planters, of which the following is a specification.

The first part of my invention relates to the application, to the furrowing-wheel of a corn-planter, of a number of radially-adjustable segmental plates, whose out-turned flanges are concentric with the wheel, and have a bearing upon the surface of the ground, while the wheel penetrates the soil to any desired uniform depth, whatever the condition of the soil may be, whether as to moisture or friability.

The second part of my invention relates to the pressure-rollers or wheels, which are journalled in caster-frames, so as to follow the course of the ridge formed over the corn by the covering-shares, whether it be straight or curved.

The third part of my invention relates to the combination of parts, by which the seeding-mechanism is actuated.

Figure 1 is a perspective view of a corn-planter embodying my invention.

Figure 2 is a bottom view of the same.

Figure 3 is a vertical section through the furrow-wheel shafts, looking toward the rear of the machine.

A is the frame of the machine, which is mainly supported on the two furrowing-wheels B B', the shafts C of the said wheels having journal-bearings c in the frame.

The wheels B B' have, preferably, a V-formed tread or periphery.

Secured to one side of each furrowing-wheel, are segmental plates D, whose edges E are turned rectangularly outward from the side of the wheel, and are concentric with it, so as to have bearing upon the surface of the ground, and prevent the too great penetration of the wheel.

F are slots in the segmental plates, extending in a radial direction of the wheel, and G are bolts, which pass through the wheel, and occupy the slots, and by which the segmental plates are mainly held in place upon the wheel.

H are pins, which occupy gains h in the inner edge of the segmental plates, and holes h' in the wheel.

To regulate the depth of furrow made by the wheels B B', the bolts G are loosened, and the pins H withdrawn from the holes h', and the segments D so adjusted that the flanges E are at the required distance from the periphery of the wheel. The pin H is then inserted in the appropriate hole h', and by its occupation of the gain h, prevents the turning of the segment upon its holding-bolt G, and also presents a rigid obstacle to the centripetal movement of the segment, which would otherwise take place, owing to the pressure of the ground upon the segment.

After the segment has been adjusted to the pin H, the bolt G is tightened.

The seed is discharged from the hoppers by the usual reciprocating slides I, which are connected to the opposite arms of the lever K by links J.

At the longer and forward end of the plate or lever K, are two eyes, L, for the engagement of two links, M N, which connect, respectively, with a spring, O, and an arm, p, of the lever P.

The lever P is pivoted to the frame, and has a curved extension or arm, p', which receives the impingement of a wiper, Q, upon the side of the wheel B', causing the movement of the lever P, and with it all the seeding-mechanism, the spring O causing the return movement before the next impingement of the wiper.

Pivoted in the rear bar of the frame A, are caster-frames R, giving journal-bearing to the concave-faced wheels S.

The wheels B B' are placed so far forward as to throw sufficient weight upon the caster-wheels S, to make them effectual in pressing the earth down upon the corn.

The corn drops from the seed-slides into spouts T, and, falling therefrom, is covered by the shares U, and then packed down upon the corn by the caster-wheels, as stated.

The caster-wheels S are made of such a diameter, that they will roll freely over the earth, and when coming in contact with a clod or stone, will turn the same aside, their size being insufficient to enable them to surmount it.

It will be seen, that owing to the pivoted connection of the frames R, the tendency of the wheels would be to follow the ridge made over the corn by the covering-shares, even when the said ridge has a curved course, as shown in fig. 2.

A hand-lever may be applied to the seeding-mechanism, if desired, for the purpose of operating the same. In this case, the wiper Q may be removed.

I claim, as my invention—

1. The flanged segmental plates D E F, secured to the sides of the furrowing-wheels B B', in such manner as to have radial adjustment thereon, substantially as described.

2. In combination with the furrowing-wheels B and seed-tubes T, the concave-faced pressure-rollers S, and mounted caster-frames R, as described, for the purposes set forth.

3. The combination of parts J K L M N O P Q, serving to operate the seed-slides I, substantially as shown and described.

In testimony of which invention, I hereunto set my hand.

DANIEL KEETHLER.

Witnesses:
GEO. H. KNIGHT,
JAMES H. LAYMAN.